United States Patent [19]
Hynd

[11] 3,985,530
[45] Oct. 12, 1976

[54] PRODUCTION OF GLASS FIBERS

[75] Inventor: William Christie Hynd, Lymm, England

[73] Assignee: Pilkington Brothers Limited, Merseyside, England

[22] Filed: May 2, 1975

[21] Appl. No.: 574,143

[30] Foreign Application Priority Data
May 13, 1974 United Kingdom............... 21116/74

[52] U.S. Cl. .......................................... 65/1; 65/2; 65/12; 65/125; 65/132; 65/347
[51] Int. Cl.² ......................................... C03B 37/02
[58] Field of Search ............... 65/1, 2, 12, 125, 129, 65/132, 206, 345, 347

[56] References Cited
UNITED STATES PATENTS

| | | | |
|---|---|---|---|
| 2,190,296 | 2/1940 | Richardson | 65/325 |
| 2,198,742 | 4/1940 | Salskov-Iversen | 65/325 X |
| 2,212,528 | 8/1940 | Slayter | 65/347 X |
| 3,390,972 | 7/1968 | Froberg | 65/1 |

FOREIGN PATENTS OR APPLICATIONS

| | | | |
|---|---|---|---|
| 1,064,338 | 5/1954 | France | 65/325 |

Primary Examiner—Robert L. Lindsay, Jr.
Attorney, Agent, or Firm—Sughrue, Rothwell, Mion, Zinn and Macpeak

[57] ABSTRACT

In the production of glass fibers by the use of a multi-tipped bushing arranged beneath an opening in the floor of a fore-hearth along which the molten glass flows, an apertured cover plate is disposed across the opening at or near its bottom and carries an upwardly extending duct connecting the aperture in the cover plate with a position in the fore-hearth above the floor and below the normal surface level of the glass, so that molten glass is supplied to the bushing from this position, where the glass is uninfluenced by cooling effects, and on its way thence to the bushing the glass can only contact the surface of the duct which is kept hot by the molten glass in the floor opening outside the duct. The risk of divitrified glass reaching the bushing and causing breakages is thereby much reduced.

12 Claims, 10 Drawing Figures

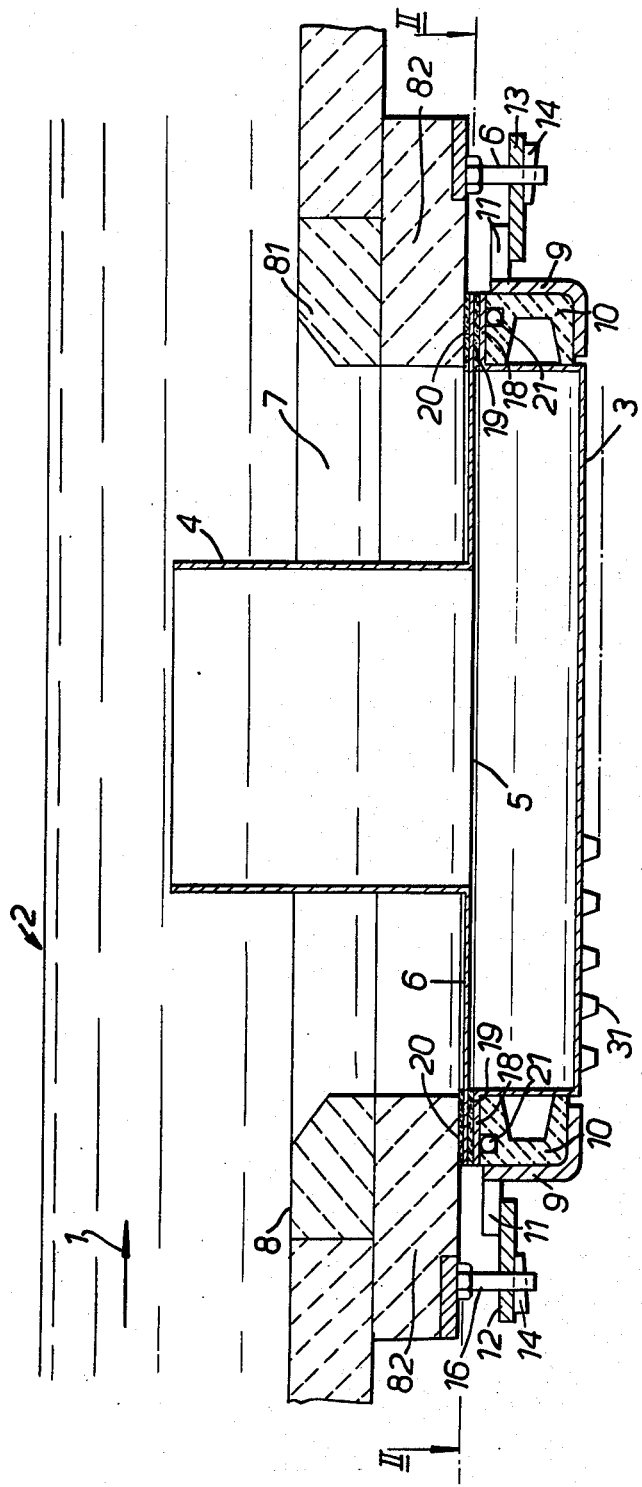
FIG. I.

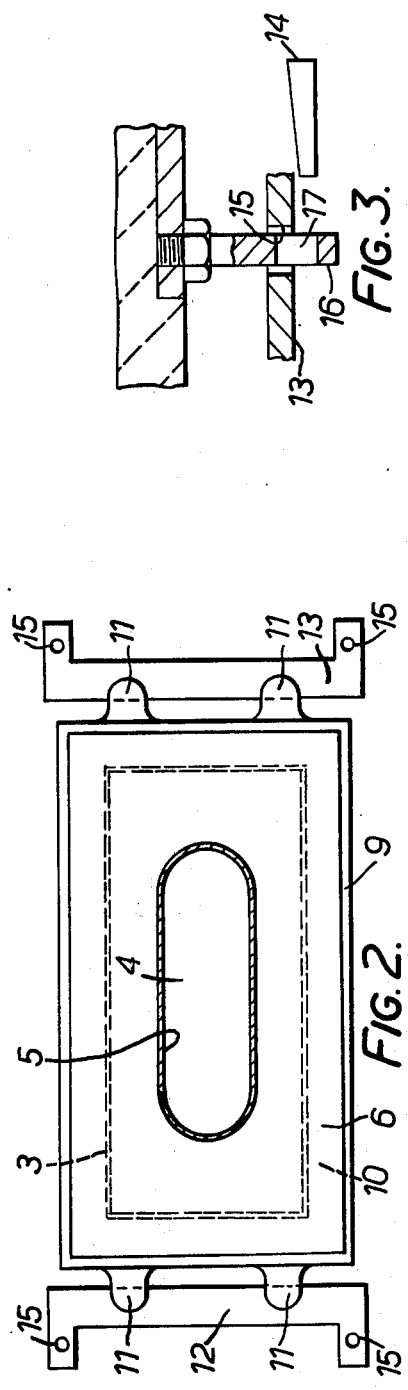
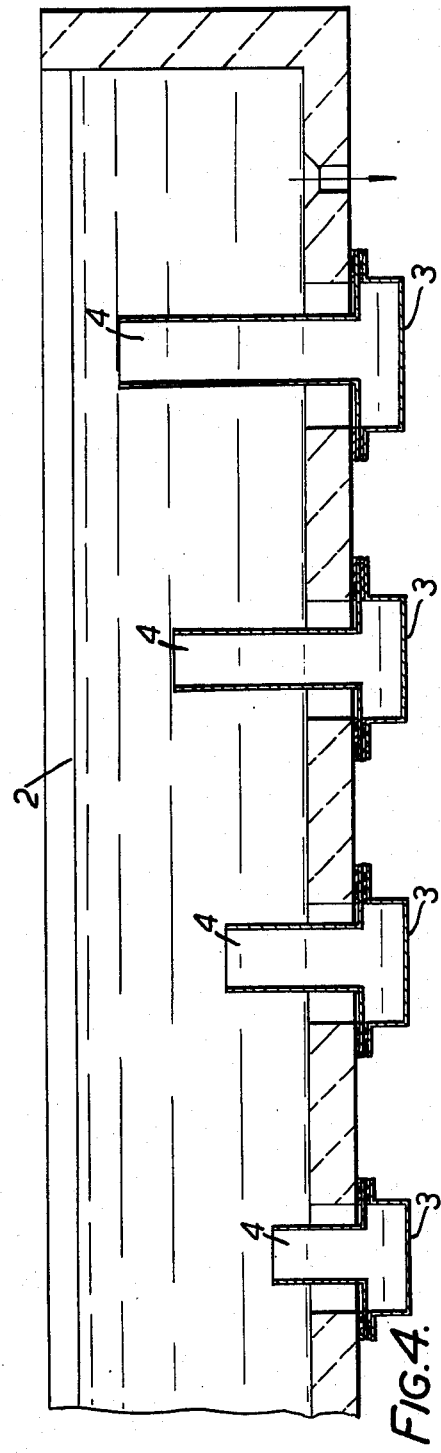

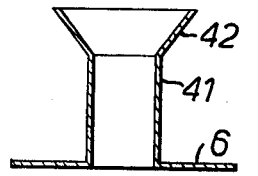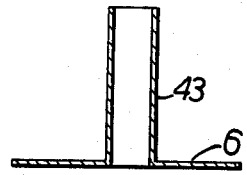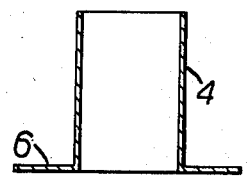
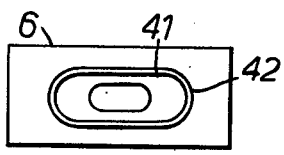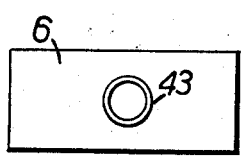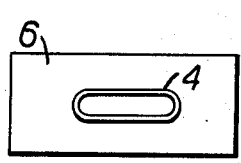
FIG.5a.     FIG.5b.     FIG.5c.
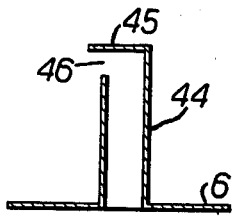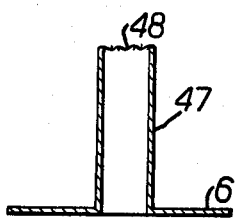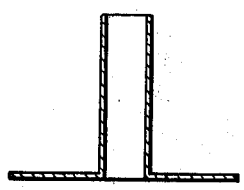
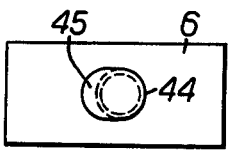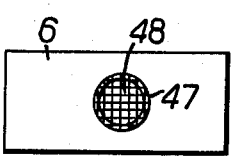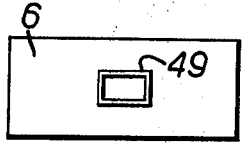
FIG.5d.     FIG.5e.     FIG.5f.

PRODUCTION OF GLASS FIBERS

BACKGROUND OF THE INVENTION

1. Field of the Invention

This invention relates to the production of glass fibres, and more specifically to apparatus and methods for the production of glass fibres by the attenuation of glass streams flowing in molten form from a bushing. The invention is particularly applicable to such apparatus operating by the so-called direct melt process, in which molten glass is supplied direct from a glass batch melting and fining furnace to the bushing.

2. Description of the Prior Art

British patent specification Nos. 976,472 and 1,214,920 contain descriptions of forms of the direct melt process, and illustrate in particular how molten glass is conveyed to a multiplicity of bushings from the glass-melting furnace along a series of channels or fore-hearths. The fore-hearths are shown as being arranged in an "H" pattern with the bushings arranged along each of the branches of the "H". The bushings are in each case mounted below an opening formed in the bottom wall or floor of the fore-hearth, the opening being defined by an aperture in a specially formed refractory block, known as a "flow block". Such flow blocks and the problems encountered in feeding molten glass to a bushing are discussed in more detail in British patent specification Nos. 1,076,264 and 1,081,643. Further systems for mounting bushings below a fore-hearth are illustrated in FIG. 3 of British patent specification No. 923,602 and FIG. 3 of British patent specification No. 908,138.

The bushing itself is generally electrically heated and essentially comprises a horizontal plate provided with a plurality of downwardly projecting tips, each having a bore or orifice through which a stream of molten glass can flow. The streams are drawn out to attenuate them and form the individual filaments, which are then grouped into strands. The bushing plate may form the bottom wall of a trough which is attached to the underside of the fore-hearth.

The refractory blocks of which the fore-hearth is made have a relatively high thermal conductivity, so that the molten glass, in its passage through the fore-hearth floor opening into the bushing, is inevitably cooled to a certain extent where it is in contact with the refractory block or blocks defining the opening. A temperature gradient is thus established in the glass, with the glass adjacent to the refractory blocks being cooler than the glass flowing through the central part of the opening.

In cases where the glass being used is prone to devitrification if subjected to any substantial cooling, the cooling of the glass adjacent to the refractory blocks can result in a build-up of devitrified glass on the surface of the refractory. Small quantities of such devitrified glass would probably remain safely attached to the refractory, but as the build-up continues the chances of particles of devitrified glass being dislodged are increased, until a stage is reached at which such particles are continually being dislodged and interfere with the operation of the bushing. The frequency of breakages of the strands increases, because the particles of devitrified glass cause individual filaments to break, and once one filament has broken the effect is to cause other filaments to break until the strand has broken. The operator must then stop drawing, remove the glass fibre already drawn, and re-start the process.

This problem has been encountered particularly with a glass having a high content of zirconia, such as we have described in our British patent specification No. 1,290,528, when forming fibres for reinforcing cementitious materials. After a relatively short operating time, using the apparatus described above, a stage has been reached where the strand breakage frequency is unacceptable for large scale continuous commercial production. Further, the more stoppages are thus caused the worse the problems become, due to temperature fluctuations caused by the stoppages.

SUMMARY OF THE INVENTION

According to the present invention, an apparatus for the production of glass fibres by attenuation of glass streams flowing from a bushing comprises at least one bushing arranged beneath an opening in the floor of a fore-hearth along which molten glass can be fed from a glass melting furnace, wherein a plate extends across the opening at or near the bottom thereof, and forms a cover for the bushing, said cover plate being formed with an aperture and carrying an upwardly extending duct spaced from the parts of the fore-hearth which surround and define the opening in the floor, said duct connecting the aperture in the cover plate to a position in the fore-hearth above the floor and below the normal surface level of the glass, so that molten glass can flow to the bushing through the duct and aperture from the said position above the floor of the fore-hearth, while the walls of the duct can be kept hot by contact with molten glass in the opening above the cover plate.

The invention also resides in a method of producing glass fibres by attenuation of glass streams flowing from a bushing, in which molten glass is supplied direct from a glass melting furnace to the bushing via a fore-hearth having a floor opening beneath which the bushing is mounted, wherein the molten glass supplied to the bushing is drawn from a position in the fore-hearth above the floor and below the surface level of the molten glass, through a duct spaced from the parts of the fore-hearth which surround and define the floor opening and carried by an apertured cover plate which extends across the floor opening at or near the bottom thereof, and forms a cover for the bushing, the walls of the duct being kept hot by contact with molten glass in the opening above the cover plate so as to avoid any substantial cooling of the molten glass as it flows to the bushing.

The invention also comprehends glass fibres produced by the method outlined in the preceding paragraph.

It will be seen that, in practising the invention, molten glass flowing to the bushing is taken from a region of the fore-hearth where no substantial cooling effect can occur due to conduction through the refractory, and the surfaces contacted by the molten glass on its passage through the duct to the bushing are kept hot by contact with the molten glass outside the duct, so that no devitrification should occur on those surfaces. Any devitrified glass which may form on the refractory and become detached therefrom is unlikely to get into the region of the fore-hearth from which the molten glass enters the duct. Instead, it will in general fall into the opening around the duct and accumulate on the top of the cover plate, where it can do no harm. Any fragments of the refractory which may become detached from the walls or floor of the furnace or the fore-hearth and enter the molten glass are also less likely to enter the bushing than in the previously used apparatus.

Preferably the aperture in the cover plate has a shape which is elongated parallel to the length of the fore-hearth, and the duct has a cross-section of similar shape and substantially the same area as the aperture.

The cover plate and the duct must naturally be able to withstand the temperatures and conditions met in the fore-hearth, and they may thus conveniently be made of the same metal as the bushing, e.g. a platinum/rhodium alloy.

The dimensions of the aperture and duct are only critical insofar as the cross-sectional area must be chosen to ensure that sufficient molten glass can enter the bushing to ensure a continuous flow of glass to the bushing tips when attenuating the molten glass streams into filaments at rates up to 12,000 to 20,000 or more feet per minute. It can be advantageous to keep the cross-section of the duct as small as possible, while having regard to the foregoing consideration, because the smaller the cross-section the faster will be the glass flow in the duct and the less time the glass will have to cool down before it reaches the bushing. The spacing between the outer surface of the duct and the parts of the fore-hearth which surround and define the opening in the floor should not be made so small as to result in the refractory blocks which form these parts exerting a detrimental cooling effect on the molten glass flowing through the duct and entering the bushing. Such a cooling effect, where the clearance begins to become so small, may however be obviated to an extent if desired by passing an electric heating current through the plate and/or the duct to raise their temperature and oppose the cooling effect.

The position in the fore-hearth at which molten glass enters the duct will be dictated by the design of the fore-hearth, the load at which the total system is operating, the position of the bushing and the viscosity/temperature characteristics of the glass fiberised. Normally a plurality of bushings are spaced along the length of the fore-hearth, beneath respective openings in the floor, and a cover plate and duct as described above will then be provided for each bushing. The position within the glass flow from which molten glass enters the bushing can then be varied from one bushing position to another. Thus the height of the tops of the ducts can be increased in progression along the length of the fore-hearth. In this way one can arrange that the first bushing is fed with glass from near the centre of the flow, and successive bushings are fed at positions becoming nearer to the surface, until the final bushing is fed with glass from just below the surface. This means that the molten glass flows along in a direct path to its position of take-off, and there is little or no disturbance to the flow due to the previous take-off of glass. We have found that such an arrangement reduces the chances of areas of stagnancy occurring, as the molten glass is not diverted from its direct path. The entrance into the upper end of the duct for the molten glass may be in the form of an inlet facing upwards or it may be in the form of an inlet facing into the direction of flow of the molten glass so that the effect is similar to that of an immersed skimmer dividing and skimming away the glass. It is also possible to exert some temperatre control so that the temperature of the molten glass entering each bushing is approximately the same. These measures all lead to greater uniformity of operation.

Where the duct has an inlet facing upwards, i.e. is formed as an open ended pipe down which the molten glass flows, it can be arranged to have a funnel- or cone-shaped head to increase the area over which glass collects to flow down the duct.

A bottom drain may be provided in the floor of the fore-hearth, e.g. at the end beyond the last of the bushings, for draining off impurities which may collect in the fore-hearth. Alternatively, a weir overflow might be used.

BRIEF DESCRIPTION OF THE DRAWINGS

In the accompanying drawings:

FIG. 1 is a schematic representation of a section along the centre line of a fore-hearth showing a bushing positioned beneath an opening in the floor;

FIG. 2 is a plan view showing the construction of the bushing and means for mounting it below a fore-hearth;

FIG. 3 is a cross-section through one of four bushing supports to illustrate the mounting of the bushing;

FIG. 4 is a schematic section along the centre line of a fore-hearth illustrating the relative positions of the tops of the ducts in one form of the invention; and FIGS. 5 a to f illustrate different forms of duct and cover plate.

DETAILED DESCRIPTION OF THE INVENTION

As shown in FIG. 1, the fore-hearth contains molten glass flowing in the direction of arrow 1 and maintained at a substantially constant level 2. The floor 8 of the fore-hearth is formed with an opening 7 surrounded and defined by the adjacent refractory blocks 81 of the floor 8 and by an additional refractory block 82 secured to the underside of the blocks 81. A cover plate 6 extends across the bottom of the opening 7 and has a central aperture 5. The cover plate 6 also has welded to it an upwardly extending duct 4 whose cross-sectional shape is the same as the shape of the aperture 5. The duct 4 is spaced from the blocks 81 and 82 defining the opening 7. The upper end of the duct 4 is open, thus providing an upward facing inlet for the molten glass at a position in the fore-hearth above the floor 8 and below the normal surface level 2 of the glass. The lower end of the duct 4 opens through the aperture 5 into a bushing 3 having a plurality of tips 31 from which streams of glass can flow in the usual manner.

The bushing 3 is mounted in a metal frame 9 with the interposition of a surrounding block of cast refractory material 10. A cooling pipe 21 through which water is circulated is disposed in a recess in the upper surface of the refractory block 10, beneath an out-turned metal flange 18 of the bushing 3. Lugs 11 on the frame 9 support it on U-shaped supporting bars 12 and 13 (FIGS. 1 and 2). The end of each limb of the bars 12 and 13 has an aperture 15. The bushing 3 is held below the fore-hearth by fitting the apertures 15 of the bars 12 and 13 over depending rods 16 which are fixed into the block 82 of the fore-hearth, and inserting wedges 14 into slots 17 in the rods 16 beneath the bars 12, 13 as shown particularly in FIG. 3. Insertion of the wedges 14 in the slots enables the out-turned flange 18 on the bushing 3 to be forced up against a gasket 19 made of a refractory material of fibrous alumina known under the trade name "Fiberfax". The cover plate 6 and its associated duct 4 is placed above the gasket 19 and a further similar gasket 20 is placed between the cover plate 6 and the bottom of the fore-hearth block 82. FIG. 1 illustrates the assembly of the plate 6 and the flange 18 on the bushing, and the gaskets 19 and 20. The joint thus formed between the bushing flange 18, plate 6, and refractory block 82 of the fore-hearth is further sealed by the fact that glass passing into the joint cools and solidifies, particularly because the joint is cooled by the water circulating through the pipe 21 in the refractory block 10 immediately below the bushing flange 18.

With this construction, molten glass can enter the bushing 3 only through the duct 4, which draws glass from a position above the floor 8 of the fore-hearth where no cooling effect occurs. The wall of the duct 4 is kept hot by the molten glass outside the duct, in the fore-hearth and the floor opening 7, so that the temperature of the glass flowing into the bushing 3 is maintained uniformly high and the risk of devitrification is much reduced.

If desired, the effect of the glass outside the duct may be supplemented by electrical heating of the cover plate 6 and/or the duct 4, e.g. by passing a heating current through them. The usual electrical heating means (not shown) which are used to heat the bushing 3 may be adapted also to heat the cover plate 6 and duct 4.

In some cases, to avoid having the double gasketed joint between the bushing flange 18, the cover plate 6 and the refractory block 82, it may be preferred to secure the cover plate to the side of the opening 7, and for this purpose the plate 6 may be formed with a peripheral flange and mounted slightly above the bottom of the opening 7.

In a production installation, we prefer to use a series of bushings arranged successively along a number of fore-hearths fed from a glass melting tank, e.g. in the known type of H-shaped arrangement referred to above.

FIG. 4 shows how a plurality of ducts 4 can be arranged to feed a similar number of bushings 3, the tops of the ducts being arranged at different levels in the flow of molten glass, so as to supply successive bushings 3 from different positions at which the glass flow is relatively undisturbed. FIG. 4 also shows a bottom drain 22 at the end of the fore-hearth beyond the last of the bushings 3, for draining off impurities.

The ducts, as indicated above, can vary in shape and a selection of shapes we have found suitable are illustrated in FIGS. 5a to f in section and plan view.

Thus the duct 41 of FIG. 5a has an approximately elliptical cross-section and a funnel-shaped top or inlet 42. The duct 43 of FIG. 5b is plain cylindrical. The duct 4 of FIG. 5c is approximately elliptical in cross-section, the major axis being disposed parallel to the direction of glass flow, and is thus similar to the duct 4 of FIGS. 1 and 2. The duct 44 of FIG. 5d is plain cylindrical with a flat projecting top cap 45 acting as an immersed skimmer and a slot-shaped inlet 46 facing into the direction of glass flow. The duct 47 of FIG. 5e is plain cylindrical with a foraminated screen 48 over its open top to keep out unwanted solid particles. The duct 49 of FIG. 5f is rectangular in section with an open top.

We have found the arrangement illustrated and described in this specification for feeding molten glass to a bushing to be particularly useful when applied to forming glass fibres of the kind described in British patent No. 1,290,528.

What is claimed is:

1. An apparatus for the production of glass fibres by attenuation of glass streams flowing from a bushing, comprising at least one bushing arranged beneath an opening in the floor of a fore-hearth along which molten glass is fed from a glass melting furnace, wherein a plate extends across the opening at or near the bottom thereof, and forms a cover for the bushing, said cover plate thereby preventing flow of molten glass from within said opening to said bushing, said cover plate being formed with an aperture and carrying an upwardly extending duct spaced from the parts of the fore-hearth which surround and define the opening in the floor, said duct connecting the aperture in the cover plate to a position in the fore-hearth above the floor and below the normal surface level of the molten glass, so that molten glass flows to the bushing through the duct and aperture from the said position above the floor of the fore-hearth, while the walls of the duct are kept hot by contact with molten glass in the opening above the cover plate.

2. An apparatus according to claim 1, wherein the aperture in the cover plate has a shape which is elongated parallel to the length of the fore-hearth, and the duct has a cross-section of similar shape and substantially the same area as the aperture.

3. An apparatus according to claim 1, wherein the cover plate and the duct are made of the same metal as the bushing.

4. An apparatus according to claim 3, wherein the plate, the duct and the bushing are made of a platinum/rhodium alloy.

5. An apparatus according to claim 1, wherein means are provided for passing an electric heating current through the plate and/or the duct.

6. An apparatus according to claim 1, wherein a plurality of bushings are spaced along the length of the fore-hearth beneath respective openings in the floor, with a cover plate and duct for each bushing, the height of the tops of the ducts increasing in progression along the length of the fore-hearth.

7. An apparatus according to claim 1, wherein the or each duct has at its upper end an inlet facing upwards.

8. An apparatus according to claim 7, wherein the inlet is cone-shaped or funnel-shaped.

9. An apparatus according to claim 7, wherein the inlet is provided with a foraminous screen.

10. An apparatus according to claim 1, wherein the or each duct has at its upper end an inlet facing into the direction of flow of the molten glass.

11. A method of producing glass fibres by attenuation of glass streams flowing from a bushing, in which molten glass is supplied direct from a glass melting furnace to the bushing via a fore-hearth having a floor opening beneath which the bushing is mounted, wherein the molten glass supplied to the bushing is drawn from a position in the fore-hearth above the floor and below the surface level of the molten glass, through a duct spaced from the parts of the fore-hearth which surround and define the floor opening and carried by an apertured cover plate which extends across the floor opening at or near the bottom thereof, and forms a cover for the bushing, the walls of the duct being kept hot by contact with molten glass in the opening above the cover plate so as to avoid any substantial cooling of the molten glass as it flows to the bushing.

12. A method according to claim 11, wherein the walls of the duct and/or the cover plate are further heated by passing an electric current therethrough.

* * * * *